United States Patent [19]

Oshima

[11] 4,304,416
[45] Dec. 8, 1981

[54] DUST COVER

[75] Inventor: Harumi Oshima, Kawasaki, Japan

[73] Assignee: Tokico Ltd., Kawasaki, Japan

[21] Appl. No.: 105,745

[22] Filed: Dec. 19, 1979

[30] Foreign Application Priority Data

Dec. 20, 1978 [JP] Japan .................. 53/175216[U]

[51] Int. Cl.³ .................... F16J 15/32; F16J 15/50
[52] U.S. Cl. .................. 277/212 FB; 277/152;
277/165; 277/DIG. 4; 74/18.1
[58] Field of Search ............ 277/152, 153, 212 FB,
277/165, 12, DIG. 4; 74/18, 18.1, 18.2

[56] References Cited

U.S. PATENT DOCUMENTS

| 3,343,855 | 9/1967 | Husen | 277/212 FB X |
| 3,460,650 | 8/1969 | Henry-Biabaud | 277/212 FB X |
| 3,490,343 | 1/1970 | Afanador et al. | 74/18.2 X |
| 3,790,985 | 2/1974 | Kessler | 74/18.1 X |
| 4,241,928 | 12/1980 | Nemoto et al. | 277/212 FB |

FOREIGN PATENT DOCUMENTS

| 13105 | 7/1980 | European Pat. Off. | 277/DIG. 4 |
| 916875 | 1/1963 | United Kingdom | 277/212 FB |

Primary Examiner—Robert S. Ward, Jr.
Attorney, Agent, or Firm—Wenderoth, Lind & Ponack

[57] ABSTRACT

A dust cover formed of a flexible material for sealing a space between a shaft and a body member which fittingly receives the shaft, with one end portion of the dust cover being connected to the shaft at the location projecting out of the body member, and the other end portion thereof being secured to the body member. The intermediate portion of the dust cover connecting the opposite end portions comprises a thick portion extending from the end portion secured to the body member and a thin thickness portion connecting the thick portion with the end portion connected to the shaft. The inner circumference of the thick portion sealingly engages with the shaft.

3 Claims, 2 Drawing Figures

DUST COVER

BACKGROUND OF THE INVENTION

This invention relates to a dust cover for sealing a space between a body member and a shaft slidably received in the body member to protect the space against the ingress of dust, water or the like.

Usually, the dust cover is formed of a flexible material such as rubber or the like, with one end portion thereof fittingly and sealingly surrounding a portion of the shaft projecting out of the body member, and the other end portion thereof being secured to the body member. The intermediate portion connecting the opposite end portions covers the space between the shaft and the body member thereby blocking the ingress of dust or the like. The relative movement between the shaft and the body member is accomodated by the intermediate portion which has a small thickness and a sufficient flexibility.

However, there are shortcomings in conventional dust covers, such that the sealing function is solely accomplished by the small thickness portion and thus the sealing function will be decreased when the small thickness portion is aged or damaged, and that in mounting the dust cover the small thickness portion, particularly, the portion adjacent to the end portion secured to the body member will sometimes be displaced radially inwardly to contact the circumference of the shaft and, thus, be carried into the bore of the body member and clamped between the shaft and the body member when fitting the shaft into the bore, and damaged accordingly.

SUMMARY OF THE INVENTION

The present invention overcomes the aforementioned shortcomings and is characterized in that the intermediate portion of the dust cover comprises a thick portion extending from the end portion secured to the body member, the inner peripheral surface of the thick portion sealingly engaging with and surrounding the shaft, and a thin portion connecting the thick portion with the end portion secured to the shaft.

BRIEF DESCRIPTION OF THE DRAWINGS

The present invention will now be described in detail in conjunction with the attached drawings which illustrate one embodiment of the invention as applied to a hand brake mechanism in a disc brake, wherein.

DETAILED DESCRIPTION OF THE PREFERRED EMBODIMENTS

Figure 1:
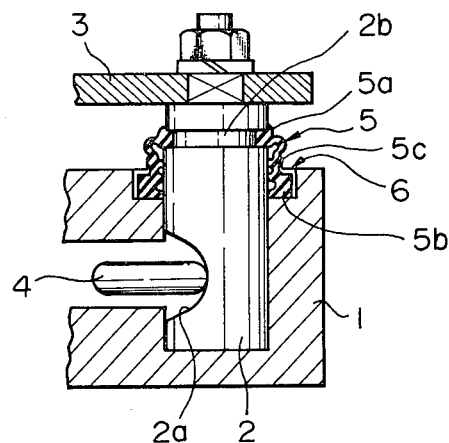
FIG. 1 is a longitudinal sectional view of the essential portion of a hand brake mechanism of a disc brake.

In FIG. 1, designated at 1 is a main body or a body member of a disc brake. The body member 1 rotatably receives rotatably therein a shaft 2, and a lever 3 connected to a hand brake lever (not shown) is secured to an end of the shaft 2 projecting out of the body member 1. A recess 2a constituting an eccentric cam is formed in the shaft 2, and one end of a rod 4 is inserted into the recess 2a to engage with the shaft 2. When the shaft 2 is rotated by actuating the hand brake lever, the rod 4 moves leftward as viewed in FIG. 1 and presses a friction pad (not shown) against one surface of a rotatable disc (not shown).

Figure 2:
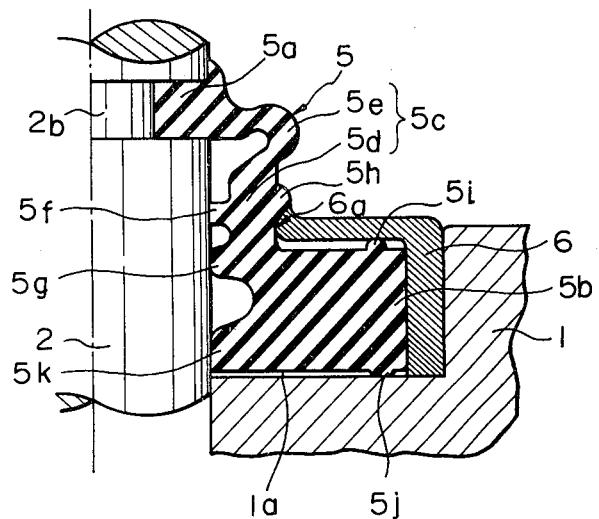
FIG. 2 is an enlarged partial sectional view of the essential portion of FIG. 1.

According to the invention, a dust cover 5 formed of a flexible material such as rubber or the like is provided between the shaft 2 and the body member 1. As shown in FIG. 2, one end (the upper end in the drawings) portion 5a is fitted on a reduced diameter portion 2b of the shaft 2, and the other end portion 5b of the dust cover 5 is received in a recess or counterbored portion 1a of the body member 1 and is retained therein by a retaining ring 6.

An intermediate portion 5c connecting the opposite end portions 5a and 5b consists of a thick portion 5d extending along the shaft 2 and extending from the end portion 5b, and a thin portion 5e connecting the thick portion 5d with the end portion 5a. The thickness of the thick portion 5d is determined such that the portion 5d will not easily deform in the transverse direction as viewed in FIG. 2. On the inner circumference of the thick portion 5d, there are formed a plurality of (two, in the embodiment) annular projections 5f and 5g, which are spaced in the direction of the axis of the shaft 2 and sealingly engage with the shaft 2.

The retaining ring 6 has a generally L-shaped cross-sectional configuration and covers the outer surface of the end portion 5b of the dust cover 5. The inner circumferential edge 6a of the retaining ring 6 engages the outer circumference of the thick portion 5d; thus, the annular projections 5f and 5g reliably engage with the shaft 2. An annular projection 5h formed on the outer circumference of the thick portion 5d assures the engagement between the inner edge 6a of the retaining ring 6 and the outer circumference of the thick portion 5d. Annular projections 5i and 5j are formed between the retaining ring 6 and the end portion 5b and between the end portion 5b and the body member 1.

The dust cover 5 of the present invention is shown as being applied on a hand brake mechanism of a disc brake, but, the invention may be applied to any other mechanisms wherein the shaft is received in the body member and is rotatable relative thereto through a predetermined angular range and also to a mechanism wherein the shaft is axially displaceable relative to the body member through a predetermined axial range. The annular projections 5f and 5g may be omitted and instead the inner circumference of the thick portion 5d can be engaged directly with the shaft, however, it is advantageous to provide the annular projections 5f and 5g since the rotational resistance of the shaft 2 can be reduced and the sealing characteristics can be improved. In the present embodiment, an annular projection 5k is provided on the inner circumference of the end portion 5b to contact the shaft 2, but, the annular projection 5k may be omitted.

As described hereinbefore, the dust cover according to the invention comprises a thick portion extending from the end portion secured to the body member, and the thick portion does not easily deform and, therefore, the dust cover will not be carried into the bore of the body member when fitting the shaft into the bore. Further, the inner circumference of the thick portion sealingly engages with the shaft thus improving the sealing characteristics. Further, a small thickness portion is provided between the thick portion and the end portion connected to the shaft, whereby the displacement of the shaft with respect to the body member can be accomodated.

What is claimed is:

1. In combination: a body member having a bore therethrough; a shaft rotatably mounted in said bore and movable in the axial direction of the shaft at most to only a limited amount, said shaft having one end projecting out of said body member; a dust cover of a resilient material having one end portion fitted in tight sealing engagement around said projecting end of said shaft, having the other end portion secured to said body member around said bore, and having the intermediate portion connecting the respective end portions, said intermediate portion having a thick portion extending from said other end portion toward said one end portion and having a plurality of annular projecting portions spaced along the thick portion in the direction of the length of said shaft and projecting from the inner circumferential surface of said thick portion into sealing engagement with said shaft.

2. The combination as claimed in claim 1 further comprising a retaining ring against the said other end portion of said dust cover for holding said other end on said body, said retaining ring having an inner circumferential edge engaging the outer peripheral surface of said thick portion at a position between two of said annular projecting portions.

3. The combination as claimed in claim 2 in which said dust cover further has a further annular projecting portion projecting from the outer circumferential surface of said thick portion and engaged over said circumferential edge of said retaining ring.

* * * * *